(12) United States Patent
Polyakov et al.

(10) Patent No.: US 8,863,284 B1
(45) Date of Patent: Oct. 14, 2014

(54) SYSTEM AND METHOD FOR DETERMINING A SECURITY STATUS OF POTENTIALLY MALICIOUS FILES

(71) Applicant: Kaspersky Lab ZAO, Moscow (RU)

(72) Inventors: Alexey A. Polyakov, Moscow (RU); Konstantin V. Sapronov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/287,172

(22) Filed: May 26, 2014

Related U.S. Application Data

(63) Continuation-in-part of application No. 14/050,851, filed on Oct. 10, 2013, now Pat. No. 8,739,287.

(51) Int. Cl.
*H04L 12/22* (2006.01)
*G06F 21/56* (2013.01)
*H04L 29/06* (2006.01)
*H04L 12/26* (2006.01)

(52) U.S. Cl.
CPC ............ *H04L 63/145* (2013.01); *G06F 21/561* (2013.01)
USPC .............................................. 726/23; 726/22

(58) Field of Classification Search
None
See application file for complete search history.

(56) References Cited

U.S. PATENT DOCUMENTS

| | | | |
|---|---|---|---|
| 6,732,279 B2 | 5/2004 | Hoffman | |
| 7,496,960 B1 | 2/2009 | Chen et al. | |
| 7,694,150 B1 | 4/2010 | Kirby | |
| 8,180,917 B1 | 5/2012 | Yan et al. | |
| 8,214,977 B2 | 7/2012 | Szor | |
| 8,584,194 B1 | 11/2013 | Kerr et al. | |
| 2002/0116494 A1* | 8/2002 | Kocol | ............................ 709/224 |
| 2004/0025016 A1 | 2/2004 | Focke et al. | |
| 2004/0153644 A1 | 8/2004 | McCorkendale et al. | |
| 2007/0162975 A1 | 7/2007 | Overton et al. | |
| 2009/0293125 A1 | 11/2009 | Szor | |
| 2009/0300761 A1 | 12/2009 | Park et al. | |
| 2011/0219451 A1 | 9/2011 | McDougal et al. | |
| 2012/0017275 A1 | 1/2012 | Harmonen | |
| 2012/0023579 A1 | 1/2012 | Zaitsev et al. | |
| 2012/0173609 A1 | 7/2012 | Kulaga et al. | |
| 2012/0210431 A1 | 8/2012 | Stahlberg et al. | |

FOREIGN PATENT DOCUMENTS

| | | |
|---|---|---|
| EP | 2169583 A1 | 3/2010 |
| WO | 9938080 A1 | 7/1999 |

\* cited by examiner

*Primary Examiner* — Venkat Perungavoor
(74) *Attorney, Agent, or Firm* — Arent Fox LLP; Michael Fainberg

(57) ABSTRACT

Disclosed are systems, methods and computer program products for determining a security status of at least one potentially malicious file in a customer network. An example method comprising receiving, by a client computer system, client heuristics information from a server system for determining a security status of client data generated by at least one client application; monitoring and identifying at least one suspicious file of the client data as a potentially malicious file by analyzing metadata associated with the at least one suspicious file using the client heuristics information; collecting threat-identification information of the potentially malicious file to exclude confidential information associated with a content of the potentially malicious file; transmitting the threat-identification information to the server system for determining a security status of the potentially malicious file; and receiving security tools from the server system to block or remove the potentially malicious file.

18 Claims, 8 Drawing Sheets

SYSTEM AND METHOD FOR DETERMINING A SECURITY STATUS OF POTENTIALLY MALICIOUS FILES

CROSS REFERENCE TO RELATED APPLICATIONS

The present application is a Continuation-in-Part of and claims priority to patent application Ser. No. 14/050,851 filed Oct. 10, 2013, which is incorporated by reference herein.

TECHNICAL FIELD

The present disclosure relates generally to the field of computer security, and in particular, to a system, method and computer program product for efficiently determining a security status of potentially malicious files.

BACKGROUND

Malware such as viruses, worms and Trojans, have become the principle threat to the normal functioning of computers and to the information stored in them. The scope and range of malicious software is constantly expanding, presenting an ever-growing security challenge. Malicious programs are also making use of new methods to penetrate computer systems, concealing their activities and bypassing detection by security software. No conventional malware detection method can now provide complete protection when used as a stand-alone tool.

SUMMARY

Disclosed are systems, methods and computer program products for efficiently determining a security status of potentially malicious files in a customer network.

In one aspect, an example method comprises receiving, by a client computer system comprising one or more processors and memory, client heuristics information from a server system for determining a security status of client data generated by at least one client application; monitoring and identifying at least one suspicious file of the client data as a potentially malicious file by analyzing metadata associated with the at least one suspicious file using the received client heuristics information; collecting threat-identification information of the potentially malicious file to exclude confidential information associated with a content of the potentially malicious file; transmitting the threat-identification information to the server system for determining a security status of the potentially malicious file based on heuristic information not shared with the client computer system; determining to transfer the potentially malicious file to the server system in response to a request based on a confidentiality level determined for the potentially malicious file; and receiving security tools from the server system to block or remove the potentially malicious file.

In one aspect, the method further comprises applying the security tools received from the server system to subsequent data obtained by the customer network.

In one aspect, the heuristic information not shared with the client computer system is more computationally intensive than the received client heuristics information and maintained by the server system.

In one aspect, the threat-identification information comprises a hash or identifier of the metadata and information relating to a source or creator of the metadata.

In one aspect, the confidentiality level is determined based at least in part on a confidentiality level associated with a storage location of the potentially malicious file in the customer network.

In one aspect, the client computer system is one of a plurality of computers that are connected to the customer network, and the server system is configured to compare information of the potentially malicious file with information of similar files on other computers in the customer network to identify patterns of activity that correspond to the potentially malicious file.

In another aspect, an example system for determining a security status of at least one potentially malicious file in a customer network comprises a hardware processors configured to: receive client heuristics information from a server system for determining a security status of client data generated by at least one client application; monitor and identifying at least one suspicious file of the client data as a potentially malicious file by analyzing metadata associated with the at least one suspicious file using the received client heuristics information; collect threat-identification information of the potentially malicious file to exclude confidential information associated with a content of the potentially malicious file; transmit the threat-identification information to the server system for determining a security status of the potentially malicious file based on heuristic information not shared with the client computer system; determine to transfer the potentially malicious file to the server system in response to a request based on a confidentiality level determined for the potentially malicious file; and receive security tools from the server system to block or remove the potentially malicious file.

In one aspect, an example computer program product, stored on a non-transitory computer-readable storage medium, comprises computer-executable instructions for determining a security status of at least one potentially malicious file in a customer network, includes instructions for: receiving, by the computer system comprising one or more processors and memory, client heuristics information from a server system for determining a security status of client data generated by at least one client application; monitoring and identifying at least one suspicious file of the client data as a potentially malicious file by analyzing metadata associated with the at least one suspicious file using the received client heuristics information; collecting threat-identification information of the potentially malicious file to exclude confidential information associated with a content of the potentially malicious file; transmitting the threat-identification information to the server system for determining a security status of the potentially malicious file based on heuristic information not shared with the client computer system; determining to transfer the potentially malicious file to the server system in response to a request based on a confidentiality level determined for the potentially malicious file; and receiving security tools from the server system to block or remove the potentially malicious file.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for or efficiently determining a security status of potentially malicious files. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
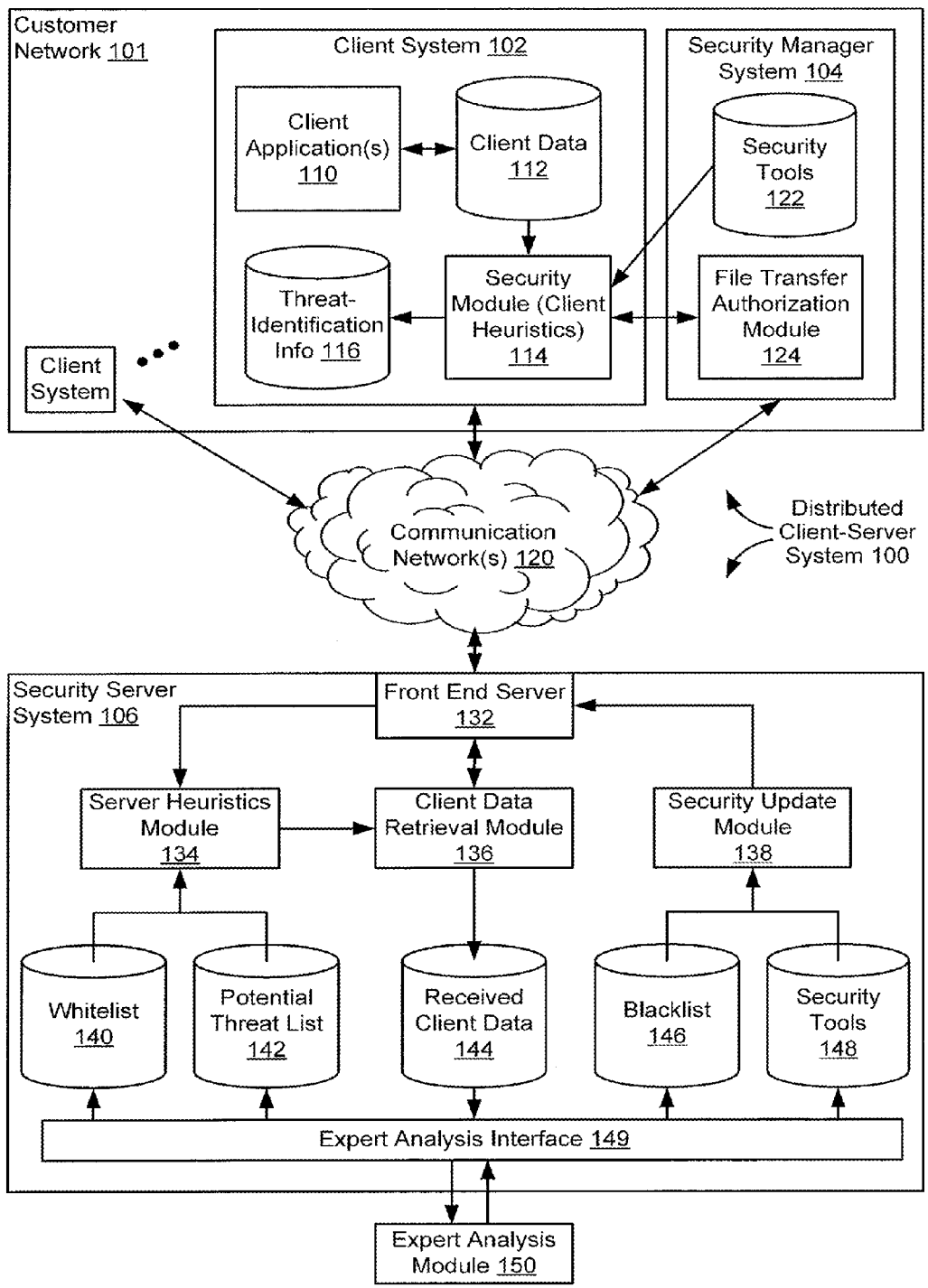
FIG. 1 is a block diagram illustrating a distributed client-server system, in accordance with some aspects.

FIG. 1 shows a block diagram illustrating an exemplary distributed Client-Server System 100 for efficiently determining a security status of potentially malicious files. System 100 includes a Customer Network 101 with one or more client systems (e.g., Client System 102) and one or more Security Manager Systems 104 and a Security Server System 106 for analyzing potentially malicious files. A Communication Network 120 connects Client System 102 and Security Manager System 104 to Security Server System 106. Communication Network 120 optionally includes the Internet, one or more local area networks (LANs), one or more wide area networks (WANs), other types of networks, or a combination of such networks.

Client System 102 optionally includes at least one client application 110, client data 112, a security module 114 with one or more client heuristics, and Threat¬ Identification Information 116. Client Application 110 accesses, stores, and generates Client Data 112 which optionally includes executable files and other files. In some circumstances Client Data 112 will include malicious or potentially malicious files (e.g., where those files are generated or downloaded by one of Client Applications 110). Security Module 114 analyzes Client Data 112 to determine a security status of Client Data 112 (e.g., monitoring client data for malicious or potentially malicious files), optionally using one or more threat identification heuristics. Information about suspicious files is stored as Threat-Identification Information 116, which includes information identifying suspicious files (e.g., a hash or unique identifier) and, optionally, metadata related to the suspicious files. Threat¬ Identification Information 116 is stored at Client System 102 for delivery to Security Sever System 106 for further analysis of the suspicious files.

Security Manager System 104 manages security for Customer Network 101 by providing Security Tools 122 (e.g., whitelists, blacklists and other security tools and client heuristics for identifying suspicious and potentially malicious files) to Client System(s) 102. In some aspects Security Manager System 104 periodically receives updates to Security Tools 122 from Security Server System 106. Additionally Security Manager System 104 enables authorization (e.g., automatically authorizes or provides an interface for security personnel associated with Customer Network 101 to authorize) delivery of potentially malicious files to Security Server System 106. In some aspects, Security Manager System 104 provides the potentially malicious files to Security Server System 106. In some aspects, Security Manager System 104 provides authorization for Client System 102 or Security Module 114 to provide the potentially malicious files to Security Server System 106.

Security Server System 106 includes Front End Server 132, Server Heuristics Module 134, Client Data Retrieval Module 136, Security Update Module 138, Whitelist 140, Potential Threat List 142, Received Client Data 144, Blacklist 146, and Security Tools 148. Front End Server 132 receives requests from Customer Network 101 (e.g., from Client System 102 and Security Manager System 104) and relays these requests to various servers or modules within Security Server System 106. Front End Server 132 also provides Customer Network 101 (e.g., from Client System 102 and Security Manager System 104) with responses from various modules and servers within Security Server System 106. When Front End Server 132 receives threat-identification information from Client System 102 (e.g., identifiers and, optionally, metadata for suspicious files), Front End Server 132 passes the threat-identification information to Server Heuristics Module 134, which applies different heuristics than the client heuristics that are applied at Security Module 114. Server Heuristics Module 134 compares the threat-identification information to Whitelist 140 and Potential Threat List 142 and optionally performs other server heuristics to identify potentially malicious files and passes the information identifying the potentially malicious files to Client Data Retrieval Module 136, which requests (via Front End Server 132) the potentially malicious files received from Client System 102. File Transfer Authorization Module 124 at Security System Manager 104, optionally, authorizes delivery of one or more of the potentially malicious files to Security Server System 106 for further analysis.

When Front End Server 132 receives the potentially malicious files, the files are stored, at least temporarily as Received Client Data 144. The received client data (e.g., potentially malicious files and optionally metadata about the potentially malicious files) is transmitted to Expert Analysis Module 150 via Expert Analysis Interface 149 and is analyzed at Expert Analysis Module 150 (e.g., an automated security analysis program running at Security Server System 106 and/ or human security experts) and the results of the analysis of the potentially malicious files by Expert Analysis Module 150 (e.g., results received via Expert Analysis Interface 149) are used to update security information at Security Server System 106 (e.g., Whitelist 140, Potential Threat List 142, Blacklist 146, and/or Security Tools 148). Security Update Module 138 retrieves Blacklist 146 and Security Tools 148 and provides the updated Blacklist 146 and Security Tools 148 to Customer Network (e.g., Client System 102 and/or Security System Manager). The updated blacklist and security tools provided by Security Server System 106 are used by Security Manager System 104 and Client System 102 to remove or quarantine malicious files, identify other suspicious and potentially malicious files, and prevent malicious files from spreading to other computer systems.

Figure 2:
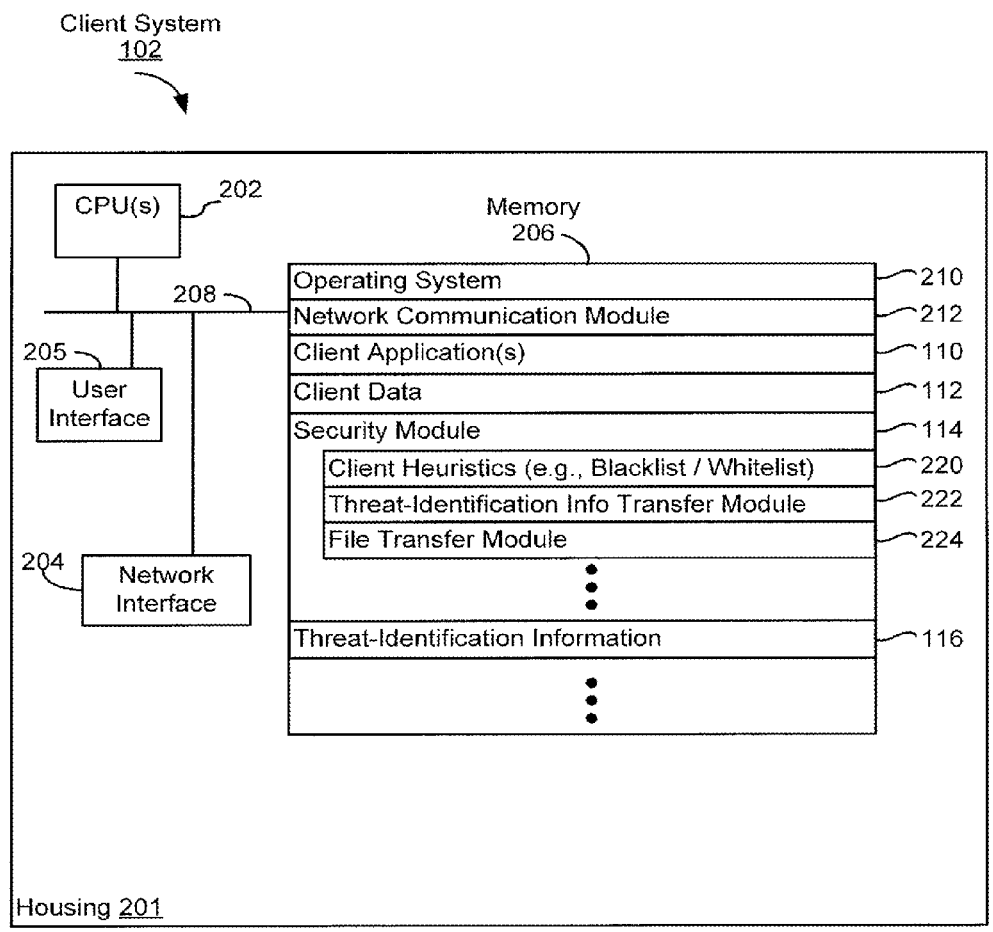
FIG. 2 is a block diagram illustrating a client system, in accordance with some aspects.

FIG. 2 is a block diagram illustrating a Client System 102 in accordance with some aspects. Client System 102 optionally includes Housing 201 and typically includes one or more processing units CPU(s) 202, one or more network or other Communication Interfaces 204, Memory 206, User Interface 205 comprising a display device and a keyboard, mouse, touchpad, touchscreen or other input device, and one or more Communication Buses 208 for interconnecting these components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from CPU(s) 202. Memory 206, or alternatively the non-volatile memory device(s) within Memory 206, comprises a non-transitory computer readable storage medium. In some aspects, Memory 206 or alternatively the non-transitory computer readable storage medium stores the following programs, modules and data structures, or a subset thereof:

- Operating System 210 that includes procedures for handling various basic system services and for performing hardware dependent tasks;
- Network Communication Module (or instructions) 212, for connecting Client System 102 to other computers (e.g., Security Server System 106 and Security Manager System 104) via one or more Network Interfaces 204 (wired or wireless) and one or more Communication Networks 120 (FIG. 1), such as the Internet, other wide area networks, local area networks, metropolitan area networks, and so on;
- Client Application(s) 110, for performing user-specified operations at Client System 102 and accessing, storing, and generating Client Data 112;
- Security Module 114, for monitoring Client Data 112 and Client Applications 110 for suspicious activity or suspicious files, including:
- Client Heuristics 220, such as blacklist(s), whitelist(s) and/or programmatic heuristics for identifying suspicious files and activity;
- Threat-Identification Information Transfer Module 222 for transferring threat-identification information to Security Server System 106 and Security Manager System 104; and
- File Transfer Module 224 for transferring potentially malicious files to Security Server System 106 for further analysis to determine whether the potentially malicious files are malicious; and
- Threat-Identification Information 116, including information identifying suspicious files (e.g., a hash or unique identifier) and, optionally, metadata related to the suspicious files (e.g., information identifying a timestamp, creator and/or source of the suspicious file as recorded by Client 102) that can be provided to Security Server System 106 for further analysis to determine whether any of the suspicious files are potentially malicious files.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various aspects. In some aspects, Memory 206 optionally stores a subset of the modules and data structures identified above. Furthermore, Memory 206 optionally stores additional modules and data structures not described above.

Figure 3:
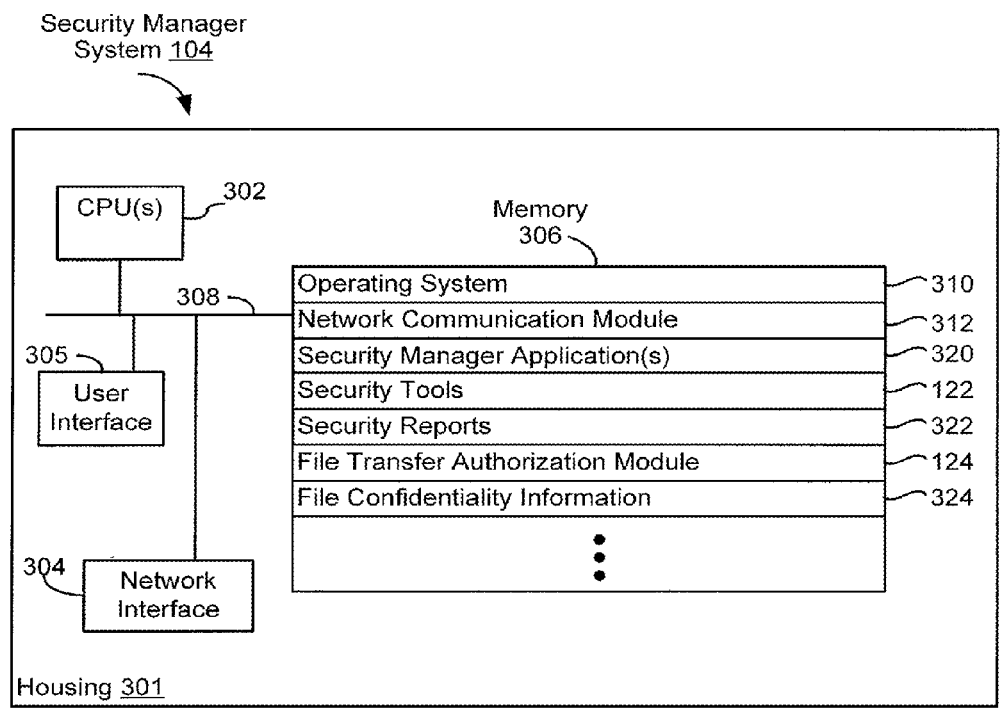
FIG. 3 is a block diagram illustrating a security manager system, in accordance with some aspects.

FIG. 3 is a block diagram illustrating a Security Manager System 104 in accordance with some aspects. Security Manager System 104 optionally includes Housing 301 and typically includes one or more processing units CPU(s) 302, one or more network or other Communication Interfaces 304, Memory 306, User Interface 305 comprising a display device and a keyboard, mouse, touchpad, touchscreen or other input device, and one or more Communication Buses 308 for interconnecting these components. Memory 306 typically includes high-speed random access memory, such as DRAM, SRAM, DDR RAM or other random access solid-state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some aspects, Memory 306 or alternatively the non-transitory computer readable storage medium stores the following programs, modules and data structures, or a subset thereof:

- Operating System 310 that includes procedures for handling various basic system services and for performing hardware dependent tasks;
- Network Communication Module (or instructions) 312, for connecting Security Manager System 104 to other computers (e.g., Security Server System 106 and Client System 102) via one or more Network Interfaces 304 (wired or wireless) and one or more Communication Networks 120 (FIG. 1), such as the Internet, other wide area networks, local area networks, metropolitan area networks, and so on;
- Security Manager Application(s) 320, for managing security settings and monitoring security of Customer Network 101 and clients in Customer Network 101 and for determining (e.g., automatically or based on input from security personnel associated with Customer Network 101) whether or not to authorize the transfer of potentially malicious files to Security Server System 106 for further analysis;
- Security Tools 122, such as whitelist(s), blacklist(s) and other security tools and client heuristics for identifying suspicious and potentially malicious files and other network-wide tools for analyzing suspicious activity and providing updated client heuristics to clients in Customer Network 101;
- Security Reports 322, including information about security issues (e.g., patterns of identified malicious files and potentially malicious files sent to Security Server System 106 for analysis);
- File Transfer Authorization Module 124, for providing authorization to Client System 102 to provide potentially malicious files to Server System 106 for further analysis; and File Confidentiality Information 324, for use in determining whether confidential information from Customer Network 101 is likely to be compromised by transmitting any of the potentially malicious files to Security Server System 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various aspects. In some aspects, Memory 306 optionally stores a subset of the modules and data structures identified above. Furthermore, Memory 306 optionally stores additional modules and data structures not described above.

Figure 4:
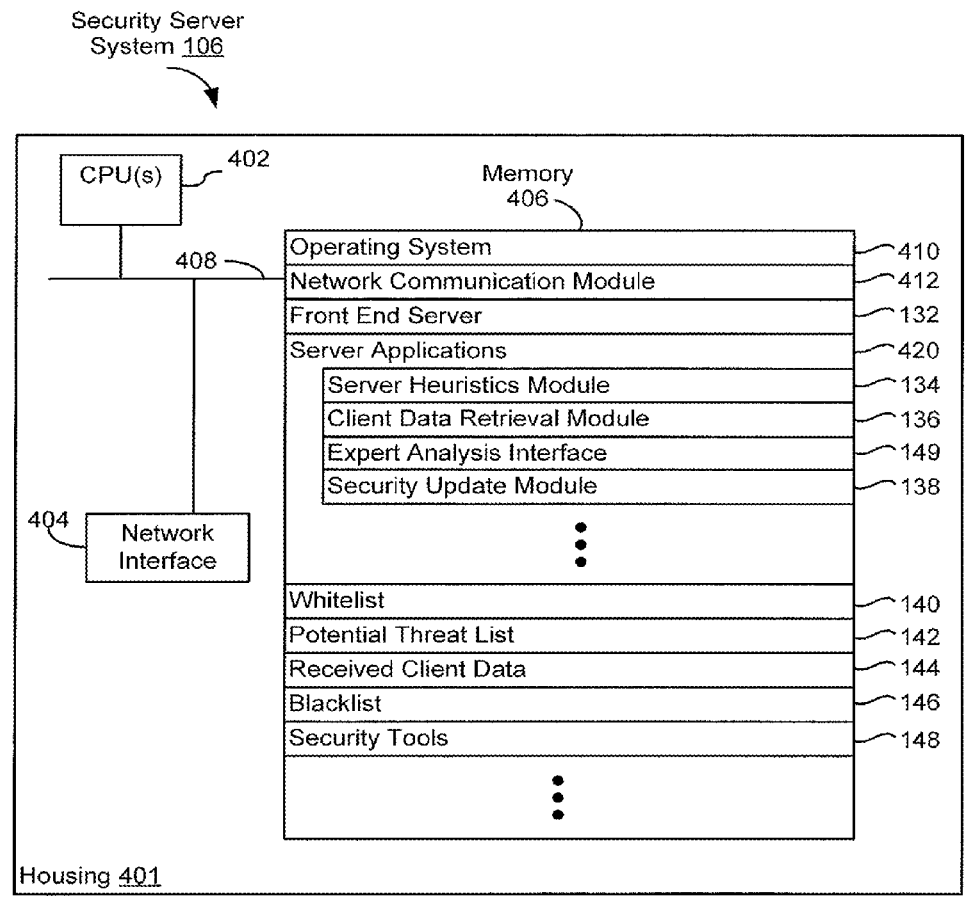
FIG. 4 is a block diagram illustrating a server system, in accordance with some aspects.

FIG. 4 is a block diagram illustrating a Security Server System 106 in accordance with some aspects. Security Server System 106 optionally includes Housing 401 and typically includes one or more processing units CPU(s) 402, one or more network or other Communications Interfaces 412, Memory 406, and one or more Communication Buses 408 for interconnecting these components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some aspects, Memory 406 or alternatively the non-transitory computer readable storage medium stores the following programs, modules and data structures, or a subset thereof:

- Operating System 410 that includes procedures for handling various basic system services and for performing hardware dependent tasks;
- Network Communication Module (or instructions) 412, for connecting Security Server System 106 to other computers (e.g., Client System 102 and Security Manager System 104) via one or more Network Interfaces 404 (wired or wireless) and one or more Communication Networks 120 (FIG. 1), such as the Internet, other wide area networks, local area networks, metropolitan area networks, and so on;
- Front End Server 132 for coordinating communication between Security Server System 106, Client System 102 and any other computer systems with which Security Server System 106 communicates;
- Server Applications 420, including:
  - Server Heuristics Module 134, for applying server heuristics to threat-identification information received from Client Systems 102 to identify potentially malicious files by analyzing a file's similarity to known malicious files, analyzing the results of execution of the file on a virtual machine, and/or analyzing the response of existing third party antivirus products to the file;
  - Client Data Retrieval Module 136 for requesting potentially malicious files identified by Server Heuristics Module 134 from Client System 102;
  - Expert Analysis Interface 149, for enabling expert security analysts to analyze potentially malicious files and update security information at Security Server System 106 (e.g., Whitelist 140, Potential Threat List 142, Blacklist 146, and/or Security Tools 148); and
  - Security Update Module 138 for providing updated security infOlmation (e.g., Whitelist 140, Potential Threat List 142, Blacklist 146, and/or Security Tools 148) to Customer Network 101 (e.g., Client System 102 and Security Manager System 104);
- Whitelist 140, including information (e.g., hashes or unique identifiers) for identifying one or more files that are known to be safe and are not malicious;
- Potential Threat List 142, including information (e.g., hashes or unique identifiers) for identifying one or more potentially malicious files that are not known to be safe and are also not known to be malicious;
- Received Client Data 144, for storing data received from client systems, including threat-identification information and potentially malicious files;
- Blacklist 146, including information (e.g., hashes, unique identifiers, or malware definitions/signatures) for identifying one or more files that are known to be malicious; and
- Security Tools 148, including security programs for use by Security Manager System 104 and Client System 102 to remove or quarantine malicious files, identify other suspicious and potentially malicious files, and prevent malicious files from spreading to other computer systems.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various aspects. In some aspects, Memory 406 optionally stores a subset of the modules and data structures identified above. Furthermore, Memory 406 optionally stores additional modules and data structures not described above.

Although FIG. 4 shows a "Security Server System" 106, FIG. 4 is intended more as functional description of the various features which may be present in a set of servers than as a structural schematic of the aspects described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement Security Server System 106 and how features are allocated among them will vary from one implementation to another, and optionally depends in part on the amount of data traffic that the system must handle during peak usage periods as well as during average usage periods.

Figure 5:
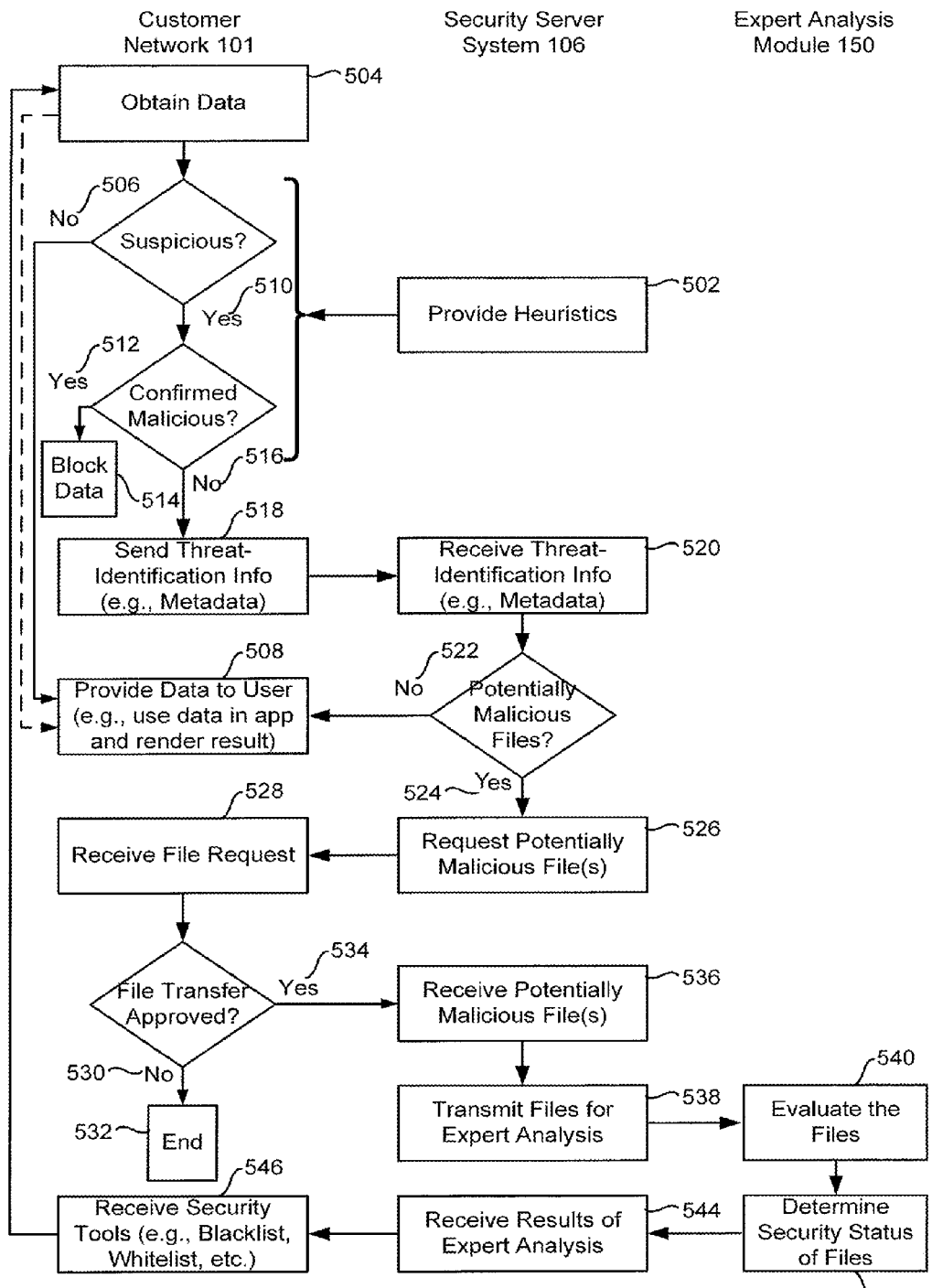
FIG. 5 is a flow chart illustrating communications between a client system and server system when determining a security status of data obtained by a customer network, in accordance with some aspects.

FIG. 5 shows a flowchart representing communications between Customer Network 101 and Security Server System 106 when determining a security status of potentially malicious files, according to certain aspects. Security Server System 106 optionally provides (502) client heuristics to Customer Network 101 (e.g., Client System 102 and/or Security Manager System 104) for use in identifying suspicious files. In some aspects, the client heuristics are simpler and less computationally intensive than server heuristics that are executed by Security Server System 106, so as to reduce resource usage and improve performance at Customer Network 101. After receiving the client heuristics, a client at Customer Network 101 obtains (504) data (e.g., data received or downloaded from an external source or data generated by an application running on a computer within Customer Network 101). Using client heuristics, the client at Customer Network 101 determines whether the data is suspicious (e.g., whether the data matches a whitelist of safe files) and when the data is not (506) suspicious (e.g., the data is matches the whitelist), the client provides (508) the data to a user of the client (e.g., by executing an application that uses the data to generate an output for display to a user and renders the output on a display that is in communication with Client System 102).

In some aspects, after the data is obtained by Customer Network 101 (e.g., as shown in operation 504), it is provided (508) to the user without regard to whether or not the data is determined to be suspicious. In some aspects, the determination of the security status of the obtained data is performed asynchronously (e.g., the obtained data is provided to the user so that the user can use the data without delay while the Customer Network 101 and Security Sever System 106 determine the security status of the obtained data). In some aspects, if data that is determined to be suspicious or malicious has been provided to the user, the user is alerted (e.g., via a message at Client System 102) that the data is suspicious or malicious (depending on the determination). In some aspects, if data that has been provided to the user is later determined to be suspicious or malicious, the data is quarantined or deleted in response to the determination that the data is suspicious or malicious (depending on the determination). For example, if data is determined to be suspicious, the suspicious data is quarantined pending further analysis of the suspicious data; and/or if data is determined to be malicious, the malicious data is deleted.

However, if the data is (510) suspicious (e.g., the data is does not match the whitelist) the client determines (e.g., using Security Module 114 in FIGS. 1 and 2), based on the client heuristics whether the data is confirmed malicious data (e.g., whether the data matches a blacklist of malicious files), and when the data is (512) is confirmed to be malicious (e.g., the data matches the blacklist of malicious files), the client blocks (514) a user of the client from accessing the data (e.g., by deleting or quarantining the data). However, if the data is suspicious but is not (516) confirmed to be malicious (e.g., the does not match a whitelist but is not on a blacklist), the client collects threat-identification information (e.g., a hash or identifier for the data and, optionally, relevant metadata such as a date of creation or a source/creator of the data). In some aspects, the threat identification information is selected so as to exclude potentially confidential information (e.g., no information about the contents of the suspicious data is included in the threat identification information, so that companies with potentially confidential information will be able to use capabilities of the Security Server System to analyze suspicious data without being concerned about the leakage of confidential information outside of Customer Network 101). After analyzing the security status of the received data using client heuristics, Customer Network (e.g., Client System 102 or Security Manger System 104) sends (518) the threat-identification information to Security Server System 106 for further analysis.

Security Server System 106 receives (520) the threat-identification from Customer Network 101 and analyzes the threat-identification information using server heuristics (e.g., using Server Heuristics Module 134) to determine whether the suspicious data includes any potentially malicious files. In some aspects, the server heuristics are more computationally intensive and/or include private information that is maintained by the Security Server System 106. Using private heuristic information that is not shared with clients enables Security Server System 106 to avoid inadvertently sharing advanced heuristic information with potential creators of malicious files, because Security Server System 106 can use the private heuristic information to improve the detection of malicious files at clients without making the private heuristic information publicly available.

If the suspicious data does not (522) include any potentially malicious files, Security Server System 106 informs Customer Network 101 (e.g., Client System 102 or Security Manager System 104) that the suspicious data is not potentially malicious and the suspicious data is provided (508) to the user and, optionally, marked as being safe data (e.g., added to a whitelist). However, in accordance with a determination that the suspicious data does (524) include one or more potentially malicious files, Security Server System requests (526) the one or more potentially malicious files from the Customer Network 101. Customer Network 101 receives (528) the request for the potentially malicious files and determines whether or not to approve transfer of the requested files to Security Server System 106. In some aspects, an automatic process approves the transfer of files to the Security Server System 106 based on predefined criteria (e.g., whether the files are marked as confidential, include particular keywords that related to confidential information, or are stored in areas of the Customer Network 101 that include confidential information such as personnel records, financial records or new product development). In some aspects, security personnel or system administrators at Customer Network 101 manually approve individual files or manually confirm automatic determinations as to the confidentiality of the requested files.

If the requested files are not (530) approved for transfer, the requested files are not transferred to Security Server System 106 for further analysis and are optionally quarantined or further analyzed at Customer Network 101, or the process of determining a security status of the received data ends (532). However, if the requested files are (534) approved for transfer to Security Server System 106, the requested files are transmitted to Security Server System 106 for further analysis and are received (536) by Security Server System 106. After receiving the requested potentially malicious files, Security Server System 106 performs additional analysis on the potentially malicious files, including transmitting (538) the files to expert security analysts for analysis (e.g., via Expert Analysis Interface 129 in FIGS. 1 and 4). At Expert Analysis Module 150, an automated security analysis program (e.g., a program running at Security Server System 106), a human security expert (e.g., using a computer that is part of Security Server System 106 or a separate computer that is in communication with Security Server System 106), or both, evaluate (540) the potentially malicious files and determine (542) a security status of the potentially malicious files (e.g., by determining that one or more of the potentially malicious files are verified to be malicious and/or by determining that one or more of the potentially malicious files are verified to be safe or non-malicious).

Security Server System 106 receives (544) the results of the expert analysis from Expert Analysis Module 150 (e.g., via Expert Analysis Interface 129 in FIGS. 1 and 4) and generates or updates security tools and provides the security tools to Customer Network 101 for use in blocking and removing malicious files from Customer Network 101. These security tools optionally include updates to some of the client heuristics that were provided to Customer Network in step 502. Customer Network 101 receives (546) the security tools and applies the security tools to data that is obtained by Customer Network 101 in the future.

Figure 6A:
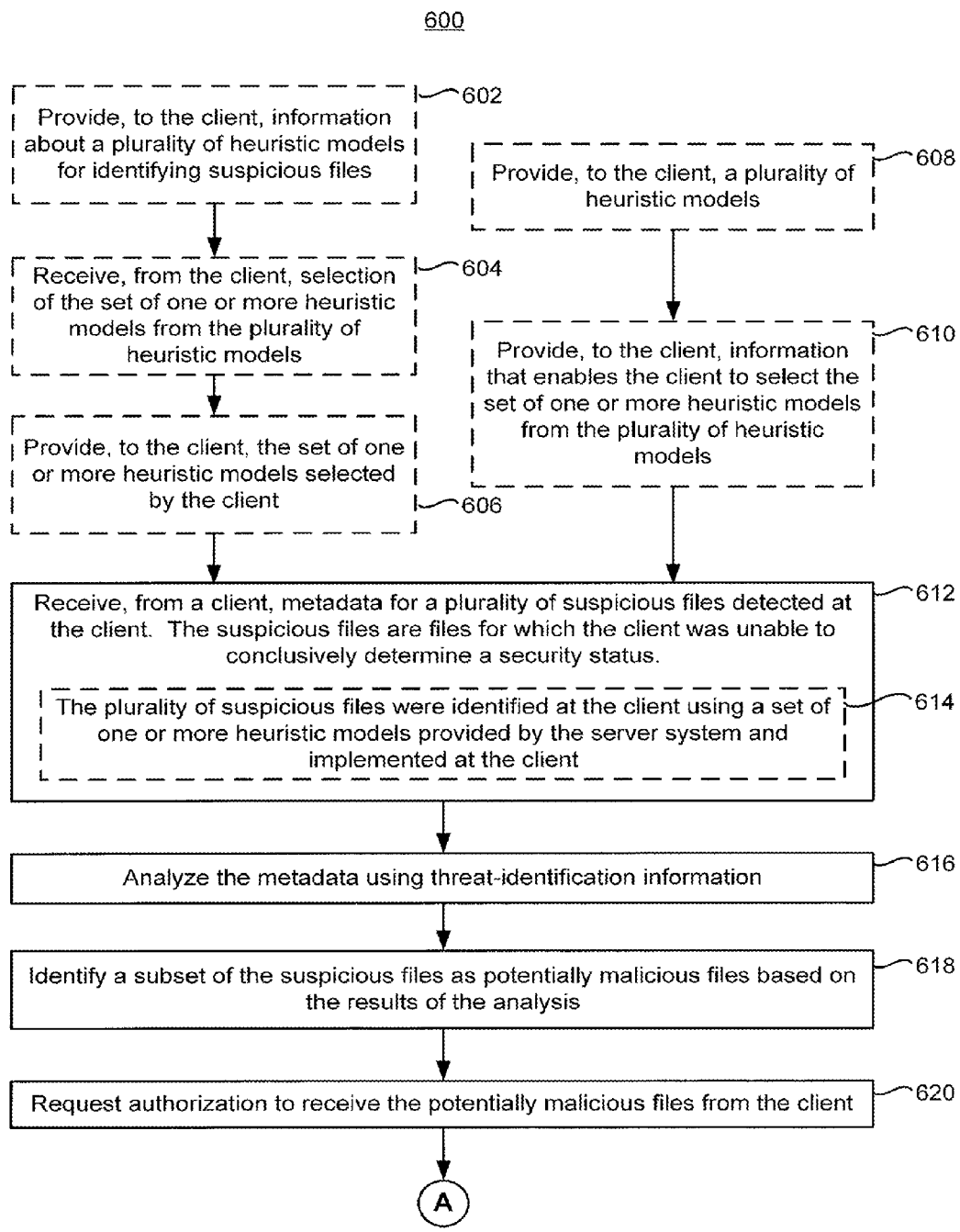
FIGS. 6A-6B include a flow chart illustrating a method for determining a security status of potentially malicious files, in accordance with some aspects.
Figure 6B:
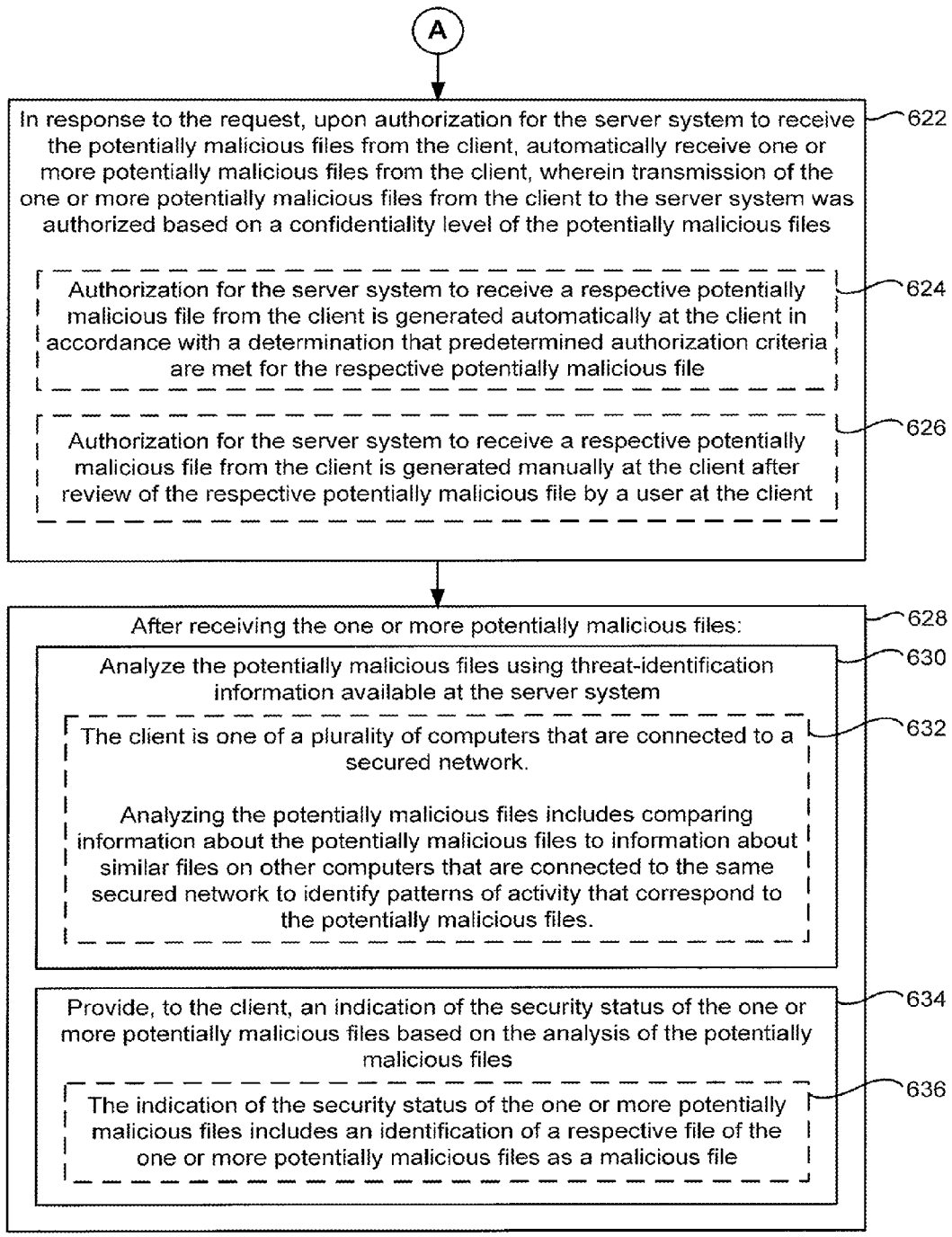

FIGS. 6A-6B include a flowchart representing a method 600 for efficiently determining a security status of potentially malicious files, according to certain aspects. In particular, method 600 describes in greater detail operations performed at Security Server System 106 (e.g., operations 502, 520, 522, 524,526,536,538, and/or 544, and, optionally. operations 540 and 542), as discussed above in FIG. 5. Method 600 is, optionally, governed by instructions that are stored in a non-transitory computer readable storage medium and that are executed by one or more processors of one or more servers (e.g., Server 106, FIG. 4). Each of the operations shown in FIGS. 6A-6B optionally corresponds to instructions stored in a computer memory or computer readable storage medium (e.g., memory 406 of Server 106 in FIG. 4). The computer readable storage medium optionally include a magnetic or optical disk storage device, solid state storage devices such as Flash memory, or other nonvolatile memory device or devices. The computer readable instructions stored on the computer readable storage medium optionally include one or more of: source code, assembly language code, object code, or other instruction format that is interpreted by one or more processors. Some operations in method 600 are, optionally, combined and/or the order of some operations are, optionally, changed.

In some aspects, a server system (e.g., Security Server System 106 in FIGS. 1 and 4) provides (602), to the client (e.g., Client System 102 in FIGS. 1 and 2), information about a plurality of heuristic models for identifying suspicious files, receives (604), from the client, selection of the set of one or more heuristic models from the plurality of heuristic models and server system (e.g., Security Update Module 138 in FIGS. 1 and 4) provides (606), to the client, the set of one or more heuristic models selected by the client. For example, the client is provided (e.g., by the server system) with a description of a large number of possible heuristic models and upon receiving a selection of a subset of the heuristic models from the client, the server system provides the selected set of heuristic models to the client for user in identifying suspicious files. In some aspects, the server system provides (608), to the client, a plurality of heuristic models; and the server system (e.g., Security Update Module 138 in FIGS. 1 and 4) provides (610), to the client, information that enables the client to select the set of one or more heuristic models from the plurality of heuristic models. For example, the client is provided (e.g., by the server system) with a large number of possible heuristic models and is given the option to select a subset of the plurality of heuristic models and use only those heuristic models that the client has selected to identify suspicious files).

The server system (e.g., with Front End Server 132 in FIGS. 1 and 4) receives (612), from a client, metadata for a plurality of suspicious files detected at the client, where the suspicious files are files for which the client was unable to conclusively determine a security status. In some aspects, the client was unable to identify the files as safe files or malicious files (e.g., the suspicious files are files that are not on a whitelist or a blacklist that is stored at the client). In some aspects, the plurality of suspicious files were identified (614) at the client using a set of one or more heuristic models provided by the server system and implemented at the client.

The server system (e.g., with Server Heuristics Module 134 in FIGS. 1 and 4) analyzes (616) the metadata using threat-identification information. In some aspects, the threat-identification information is not available at the client (e.g., the threat-identification information private virus definitions or heuristics that are too computationally intensive to run at the client computer without substantial negative impacts on user experience). After analyzing the metadata, the server system identifies (618) a subset of the suspicious files as potentially malicious files based on the results of the analysis and the server system (e.g., with Client Data Retrieval Module 136) requests (620) authorization to receive the potentially malicious files from the client. In response to the request, upon authorization for the server system (e.g., by File Transfer Authorization Module 124 in FIGS. 1 and 2) to receive the potentially malicious files from the client, the server system automatically receives (622) one or more potentially malicious files from the client, where transmission of the one or more potentially malicious files from the client to the server system was authorized (e.g., by security personnel such as a human system administrator or by an automated process at the computer system at Security Manager System 104) based on a confidentiality level of the potentially malicious files.

In some aspects, authorization for the server system to receive a respective potentially malicious file from the client is (624) generated automatically at the client in accordance with a determination that predetermined authorization criteria are met for the respective potentially malicious file (e.g., the predetermined authorization criteria are met when the client determines that the respective potentially malicious file has an internal security rating below a predetermined threshold and/or is not from a storage location that is associated with particularly sensitive information). In some aspects, the server system sends a request for a first potentially malicious file and second potentially malicious file to the client, and the client determines that the first potentially malicious file does not meet the authorization criteria and determines that the second potentially malicious file does meet the authorization criteria. In some aspects, in response to the request for the first and second potentially malicious files, the server system automatically transmits (sends) the second potentially malicious file and blocks transmission of the first potentially malicious files. In some aspects, potentially malicious files whose transmission was blocked are flagged for manual review by a user of the client (e.g., a file security manager at a corporate client reviews any potentially malicious files that have been identified as possibly including sensitive corporate information and the file security manager can make a final determination as to whether or not the blocked file includes sensitive corporate information).

In some aspects, authorization for the server system to receive a respective potentially malicious file from the client is (626) generated manually at the client after review of the respective potentially malicious file by a user at the client (e.g., security personnel at the client review the respective potentially malicious file to determine that the respective potentially malicious file does not include sensitive client information before the potentially malicious file is sent to the server system for further analysis). In some aspects, the user is provided with options for blocking transmission of the respective potentially malicious file to the server system if the user determines that the respective potentially malicious file includes sensitive information. In some aspects, files at Customer Network 101 have different confidentiality levels and low confidentiality files (e.g., operating system files, public computer files) are automatically authorized to be transmitted to Security Server System 106 without human review; medium confidentiality files (e.g., user-generated data on employee computer systems that is not flagged as highly confidential and customer service documentation) are flagged for human review before being authorized to be transmitted to Security Server System 106; and highly confidential files (e.g., personnel files, financial data, and new product information) are prevented from being authorized to be transmitted to Security Server System 106 (e.g., regular security personnel are not authorized to transmit the highly confidential files outside of Customer Network 101 so as to prevent accidental leakage of confidential Customer Network 101 information, and a super-user or senior security personnel that has the authority to authorize transfer of highly confidential files outside of Customer Network 101).

After (628) receiving the one or more potentially malicious files, the server system analyzes (630) the potentially malicious files using threat-identification information available at the server system (e.g., the potentially malicious files are analyzed by a human security analyst or by an automated threat-identification process at the computer system).

In some aspects, the client is one of a plurality of computers that are connected to a secured/non-public network (e.g., a local area network, an internal corporate network, or a portion of an internal corporate network), and analyzing the potentially malicious files includes (632) comparing information about the potentially malicious files to information about similar files on other computers that are connected to the same secured/non-public network to identify patterns of activity that correspond to the potentially malicious files. For example, the server system looks for patterns of activity that occur across a corporate network so as to identify malicious activity such as the rapid distribution of an unknown and potentially malicious file to multiple computers within the local area network or a larger corporate network (e.g., a plurality of computer systems in Customer Network 101) that provides additional evidence that the potentially malicious files are actually malicious files.

After analyzing the potentially malicious files provided by the client, the server system provides (634), to the client, an indication of the security status of the one or more potentially malicious files based on the analysis of the potentially malicious files. In some aspects, the indication of the security status of the one or more potentially malicious files includes (636) an identification of a respective file of the one or more potentially malicious files as a malicious file. In some aspects, the indication of the security status of the one or more potentially malicious files includes an updated set of malicious-file definitions.

It should be understood that the particular order in which the operations in FIGS. 6A-6B have been described are merely exemplary and are not intended to indicate that the described order is the only order in which the operations could be performed. One of ordinary skill in the art would recognize various ways to reorder the operations described herein.

Figure 7:
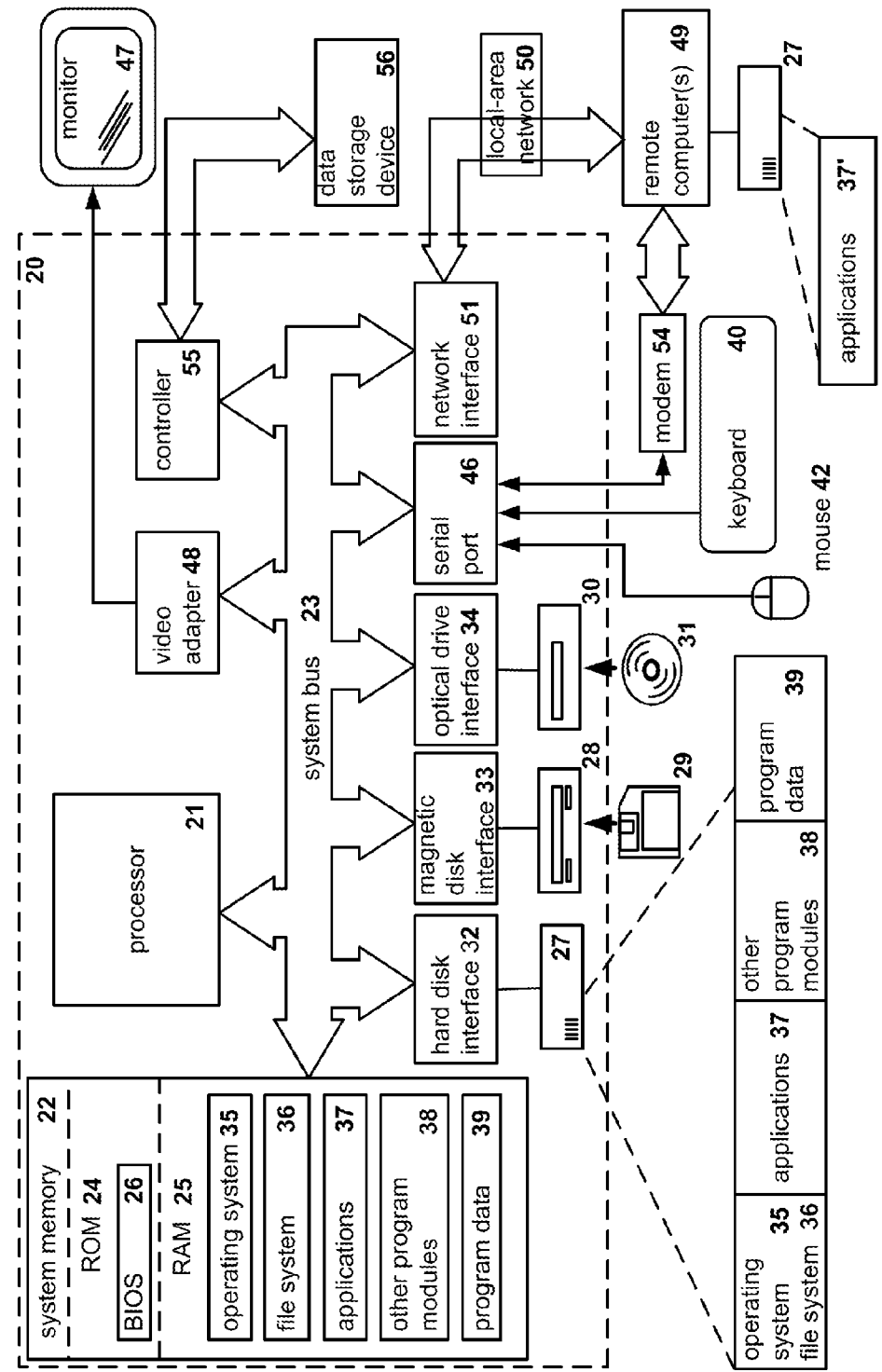
FIG. 7 is a block diagram of an example general-purpose computer system that may be used to implement systems and methods for efficiently determining a security status of potentially malicious files in accordance with various example aspects.

FIG. 7 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 7 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determining a security status of at least one potentially malicious file in a customer network, comprising:
   receiving, by a client computer system comprising one or more processors and memory, client heuristics information from a server system for determining a security status of client data generated by at least one client application;
   monitoring and identifying at least one suspicious file of the client data as a potentially malicious file by analyzing metadata associated with the at least one suspicious file using the received client heuristics information;
   collecting threat-identification information of the potentially malicious file to exclude confidential information associated with a content of the potentially malicious file;
   transmitting the threat-identification information to the server system for determining a security status of the potentially malicious file based on heuristic information not shared with the client computer system;
   determining to transfer the potentially malicious file to the server system in response to a request based on a confidentiality level determined for the potentially malicious file; and
   receiving security tools from the server system to block or remove the potentially malicious file.

2. The method of claim 1, further comprising applying the security tools received from the server system to subsequent data obtained by the customer network.

3. The method of claim 1, wherein the heuristic information not shared with the client computer system is more computationally intensive than the received client heuristics information and maintained by the server system.

4. The method of claim 1, wherein the threat-identification information comprises a hash or identifier of the metadata and information relating to a source or creator of the metadata.

5. The method of claim 1, wherein the confidentiality level is determined based at least in part on a confidentiality level associated with a storage location of the potentially malicious file in the customer network.

6. The method of claim 1, wherein the client computer system is one of a plurality of computers that are connected to the customer network, and the server system is configured to compare information of the potentially malicious file with information of similar files on other computers in the customer network to identify patterns of activity that correspond to the potentially malicious file.

7. A system for determining a security status of at least one potentially malicious file in a customer network, the system comprising:
   a hardware processors configured to:
      receive client heuristics information from a server system for determining a security status of client data generated by at least one client application;
      monitor and identifying at least one suspicious file of the client data as a potentially malicious file by analyzing metadata associated with the at least one suspicious file using the received client heuristics information;
      collect threat-identification information of the potentially malicious file to exclude confidential information associated with a content of the potentially malicious file;
      transmit the threat-identification information to the server system for determining a security status of the potentially malicious file based on heuristic information not shared with the client computer system;
      determine to transfer the potentially malicious file to the server system in response to a request based on a confidentiality level determined for the potentially malicious file; and
      receive security tools from the server system to block or remove the potentially malicious file.

8. The system of claim 7, wherein the processor further configured to apply the security tools received from the server system to subsequent data obtained by the customer network.

9. The system of claim 7, wherein the heuristic information not shared with the client computer system is more computationally intensive than the received client heuristics information and maintained by the server system.

10. The system of claim 7, wherein the threat-identification information comprises a hash or identifier of the metadata and information relating to a source or creator of the metadata.

11. The system of claim 7, wherein the confidentiality level is determined based at least in part on a confidentiality level associated with a storage location of the potentially malicious file in the customer network.

12. The system of claim 7, wherein the client computer system is one of a plurality of computers that are connected to the customer network, and the server system is configured to compare information of the potentially malicious file with information of similar files on other computers in the customer network to identify patterns of activity that correspond to the potentially malicious file.

13. A computer program product stored on a non-transitory computer-readable storage medium, the computer program product comprising computer-executable instructions for determining a security status of at least one potentially malicious file in a customer network, including instructions for:
   receiving, by the computer system comprising one or more processors and memory, client heuristics information from a server system for determining a security status of client data generated by at least one client application;
   monitoring and identifying at least one suspicious file of the client data as a potentially malicious file by analyzing metadata associated with the at least one suspicious file using the received client heuristics information;
   collecting threat-identification information of the potentially malicious file to exclude confidential information associated with a content of the potentially malicious file;
   transmitting the threat-identification information to the server system for determining a security status of the potentially malicious file based on heuristic information not shared with the client computer system;
   determining to transfer the potentially malicious file to the server system in response to a request based on a confidentiality level determined for the potentially malicious file; and
   receiving security tools from the server system to block or remove the potentially malicious file.

14. The computer program product of claim 13, further comprising instructions for applying the security tools received from the server system to subsequent data obtained by the customer network.

15. The computer program product of claim 13, wherein the heuristic information not shared with the client computer system is more computationally intensive than the received client heuristics information and maintained by the server system.

16. The computer program product of claim 13, wherein the threat-identification information comprises a hash or identifier of the metadata and information relating to a source or creator of the metadata.

17. The computer program product of claim 13, wherein the confidentiality level is determined based at least in part on a confidentiality level associated with a storage location of the potentially malicious file in the customer network.

18. The computer program product of claim 13, wherein the client computer system is one of a plurality of computers that are connected to the customer network, and the server system is configured to compare information of the potentially malicious file with information of similar files on other computers in the customer network to identify patterns of activity that correspond to the potentially malicious file.

* * * * *